United States Patent [19]

Sage et al.

[11] 4,034,778

[45] July 12, 1977

[54] ALIGNMENT CONTROL SYSTEM PARTICULARLY SUITED TO CONTROL TRAVELING IRRIGATION SYSTEMS

[76] Inventors: Douglas E. Sage, 11019 127th Place NE., Kirkland, Wash. 98033; George E. Sage, 22002 Fall City Road, Redmond, Wash. 98052

[21] Appl. No.: 665,686

[22] Filed: Mar. 10, 1976

[51] Int. Cl.² .......................................... B05B 3/00
[52] U.S. Cl. ........................ 137/344; 33/DIG. 13; 33/181 R; 239/177
[58] Field of Search ........... 239/177, 212; 137/344; 33/DIG. 13, 84, 181 R

[56] References Cited

U.S. PATENT DOCUMENTS

| | | | |
|---|---|---|---|
| 3,587,763 | 6/1971 | Kinkead | 137/344 X |
| 3,842,509 | 10/1974 | Wyman et al. | 33/DIG. 13 |

*Primary Examiner*—Alan Cohan
*Assistant Examiner*—Gerald A. Michalsky
*Attorney, Agent, or Firm*—David H. Deits; Roy E. Mattern, Jr.; Kenneth S. Kessler

[57] ABSTRACT

An electrical strain gauge is mounted to respond to movements between two sections of a structure. The gauge is mounted on a surface that deforms in response to mis-alignment of the sections in a selected plane. The mis-alignment or the deflection is detected electronically utilizing the strain gauge and the degree of deformation, mis-alignment, or flexure is monitored. Upon reaching selected magnitudes in either direction, signals are generated which may be used to control the amount of deflection. When utilized to control the alignment of sections of a traveling irrigation system, the strain gauge is attached to a bar between adjacent sections which bar flexes upon mis-alignment of sections in the horizontal plane. A pair of electrical sensors monitor the deflection but only one is permitted to generate a signal. A switching circuit selects the appropriate signal generator depending on the direction of travel of the equipment. One such circuit determines the phase sequence of the three phase AC power which sequence may be varied to change the direction of the system travel. The circuit converts the signals from two of the AC phases into two series of pulses. The existence or nonexistence of overlap between the individual pulses of the two series is dependent and indicative of the phase relationship and used to trigger a flip-flop. This phase detector may be used apart from the mis-alignment control system. The signal starts or stops a drive motor on one of the sections to realign the sections. A pair of monitors act as a safety interlock to shut down the system if the deflection is excessive in either direction.

20 Claims, 11 Drawing Figures

ALIGNMENT CONTROL SYSTEM PARTICULARLY SUITED TO CONTROL TRAVELING IRRIGATION SYSTEMS

BACKGROUND

The alignment control system is suited for controlling the angular relationship between two adjacent structures. The system is particularly suited to maintaining the alignment of traveling irrigation systems.

Traveling irrigation systems of the general type described in Boice U.S. Pat. No. 2,711,615 are used widely to irrigate large areas of farmland. A typical system consists of a series of elongated sections placed end to end. Each section consists of a liquid transporting pipe which is flexibly connected at either end to the adjacent sections. The pipes, with or without a supporting structural framework, is supported above the ground on movable carriages with a single carriage under each section of pipe. Each carriage is powered so as propel the section along in a direction applroximately normal to the alignment of the pipe. The assembled sections may be permitted to travel together the length of a field, but are typically driven in a circle about one end of the chain of sections. In such arrangement the central section is fixed to a pivot point about which the system will rotate. The water, carrying any additives desired, is connected to the first section at this point and is distributed through the flexible connections at the section joints to the other sections where it is dispensed through discharge nozzles on each section. Power to operate the carriage drives is also applied at this point and distributed along the length of the chain to each carriage. At the outermost section the pipe is capped and the carriage drive runs on a selected schedule, very often continuously. The interior section runs intermittently to keep abreast of the next outboard section. In this fashion the chair of sections travel about the pivot point approximately radially aligned dispensing the water to a circular area of terrain.

The control system is designed to maintain the alignment of the individual sections with the next adjacent section. Boice utilizes antenna rods which make and break contact with a bare wire which stretches the length of the chain of sections to control the drive motors. Bower U.S. Pat. No. 3,394,729 utilizes a cam actuated switch to accomplish the alignment control. The cam is caused to rotate when the alignment adjacent sections vary. Kinkead U.S. Pat. No. 3,587,763 accomplishes the required control with a duplex switch which is mounted on one section and is actuated by a lever mechanism fixed to the adjacent section. Misalignment of the sections moves the lever which in turn operates the switch to effect the desired control. Sandstrom U.S. Pat. No. 3,823,730 discloses the use of a photodetector or a potentiometer in order to sense and control the misalignment.

Sandstrom discloses a general scheme for control in which an output from a pivotal detector and a separate direction detector are used to trigger a comparator which responds in a predetermined manner to the possible input combinations and operates a motor actuator. The actuator in turn controls the drive motors. Two specific direction detector circuits, one based on the potentiometer sensor and one based on the photodetector, are disclosed each using electronic circuitry. A single electronic direction detector circuit is disclosed wherein the direction is determined from the phase relationship of the power supply line which power the drive motors. A single configuration of an electronic comparator circuit is also disclosed. Sandstrom further discloses an overtravel circuit which monitors the alignment detection signal and energizes a relay to stop the system when the misalignment becomes excessive.

Kinkead suggests that strain gauges sensing tension or compression at the joints between the sections may be utilized in an undisclosed manner in connection with an amplifier to slow down or speed up the drive motor to overcome destructive stresses encountered when the sections are operated on a hillside.

SUMMARY OF THE INVENTION

The system is directed toward the control of the alignment relation between two adjacent members. A particular application of the invention involves the control of an irrigation system for large fields of the type that consists of a series of articulating sections which are independently driven. The control system for such irrigation devices typically operate so that the device pivots around one end of the chain of sections which are kept in substantially linear alignment to permit coverage of a large circular area. The irrigation apparatus may also be operated, though, to travel uniformly across the field.

The components of the system, in one embodiment, are a deflecting member, a strain gauge attached to the deflecting member, a sensor for monitoring the variations detected by the strain gauge and controlling the drive, a sensor for determining the direction of the travel and to modify the signals to the drive control accordingly, and an overtravel sensor to stop the system should the misalignment become excessive.

The deflecting member mounts to the two sections whose angular relationship is to be controlled. A relative angular movement of the two sections will cause deflecting member to be deformed in a manner that corresponds to the direction and degree of misalignment.

The strain gauge is attached to a surface of the deflecting member and is responsive to the deformations induced in the deflecting member. The strain gauge is thus capable of sensing the angular misalignment of the two sections to be monitored.

The sensor for controlling the section drives is an electrical sensor which monitors the variations in the resistance presented by the strain gauge. If the drive is controlled by stop-start operation rather than variable speed, the sensor generates a signal to start the drive for one section when the strain gauge resistance reaches a point that indicates that the controlled section is behind the desired position relative to the other section. A signal is also generated to stop the drive for that section when the strain gauge resistance indicates that the controlled section is ahead of the desired position relative to the other section.

The direction sensor determines which direction the section drives are running; that is, whether in operating the irrigation apparatus to cover a circular area, the chain rotates clock-wise or counterclockwise about its pivot end. The sensor produces a signal to modify the signal reaching the section drives from the drive controlling sensor since the stop and the start signals associated with an angular variation between the sections must be interchanged to account for a change in direction of section travel.

Certain embodiments of the direction sensor are adapted to determine direction of travel from the phase relationship of three phase power which may be utilized to operate the system. The sensor in this form determines the phase relationship by developing two series of pulses isolated electrically from the power supply. The sequential time relationship of the pulses in each series is indicative of the power phase relationship and is used to generate signals applied to a flip flop whose output indicates that relationship.

The use of the direction sensor is not limited to the alignment control system.

The overtravel sensor monitors the resistance of the strain gauges and produces signals that indicate that the angular misalignment has reached an undesirable magnitude, whether because a drive wheel is slipping, the associated controls are malfunctioning, or for any other reason. The system is stopped by stopping the drive motors or shutting off system power or by similar means until the problem can be corrected. In this manner the damage which might otherwise be caused by excessive misalignment may be avoided. Alarms may similarly be activated.

In operation to cover a circular area the outermost section is permitted to operate on a selected schedule while the interior section each stop and start to maintain the desired position relative to the section radially outboard of it. The sections thus pivot in a substantially aligned manner about the innermost segment which is pivotally attached to the liquid and power supply systems.

DETAILED DESCRIPTION OF THE INVENTION

Figure 1:
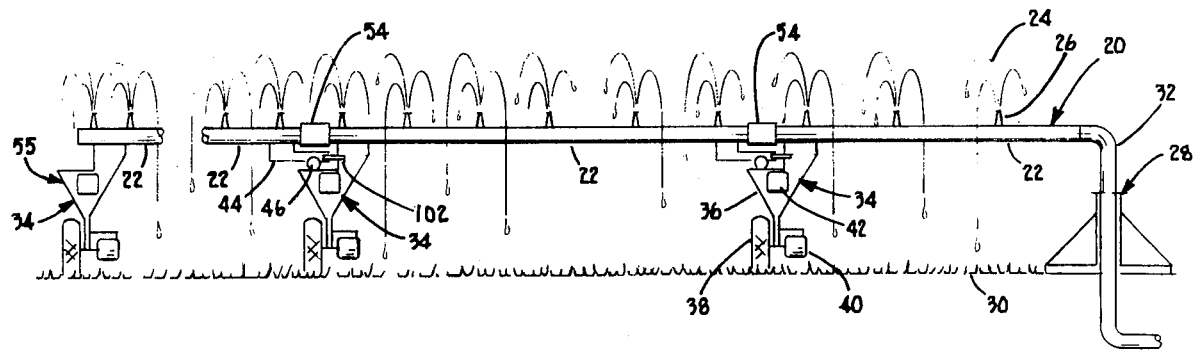
FIG. 1 is an elevation view of a typical rotating irrigation system in operation.

Irrigation systems 20, referring to FIG. 1, for large fields typically consist of a series of articulating sections 22 which may consist of sections of a distribution pipe, as shown in FIG. 1, and may include additional structural framework to provide rigidity. The sections are independently driven in a substantially aligned arrangement over the surface to be processed. Water 24 is dispensed through nozzles 26 distributed along the distribution pipe 22. Such systems are capable of irrigating large surface areas, such as an area one-half mile in diameter, in a substantially unattended operation. Such systems may also be used for the introduction of nutrients, pesticides, herbicides, and other chemicals through introduction of such compounds into the water prior to distribution.

In a typical configuration the irrigation system 20 is attached at one end to a fixed distribution terminal 28 and rotates about the terminal sweeping over a circular section of the ground 30 to be irrigated. Connection pipes 32 at the terminal pivot suitably to deliver water to the pivoting apparatus. Each section 22 has associated with it a drive assembly 34. The drive assembly includes a support structure 36 which is rigidly attached to the section 22 and supports it above the ground 30 on one or more drive wheels 38. The drive wheels 38 are directed to travel transversely to the length of the sections 22. A drive motor 40 connected to the drive wheels 38 is controlled from a control box 42 containing the electrical circuitry located on the support structure 36. The control box may be located remotely and connected electrically through wires to the controlled section.

Figure 2:
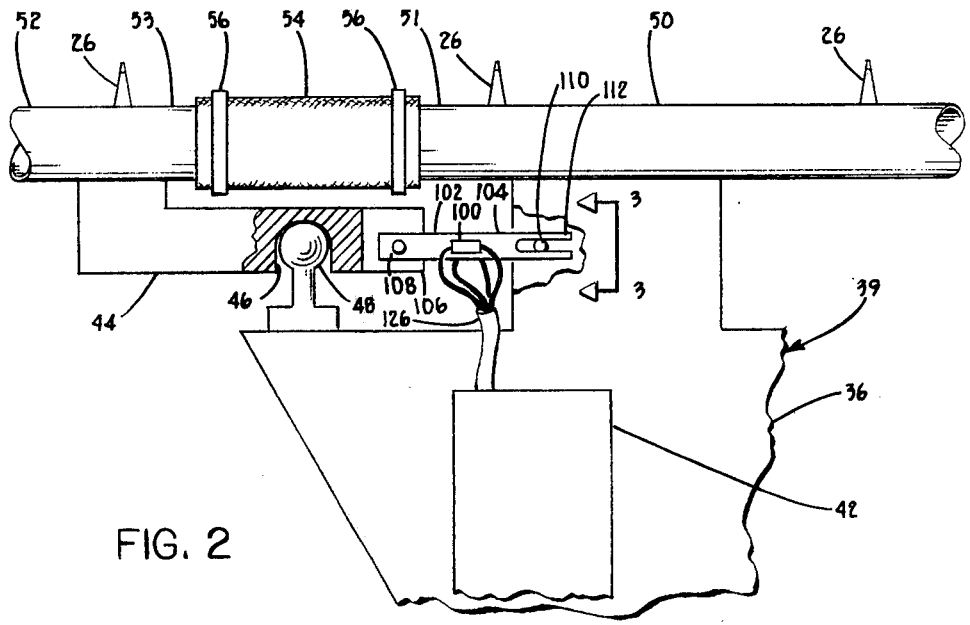
FIG. 2 is a partial elevation view of a joint between articulating sections illustrating the mounting of strain gauges on a bar attached to each section in a preferred configuration.

Referring to FIG. 2, and considering the operation of a single driven section 50 and its cooperation with an adjacent section 52, a support arm commonly 44 depends from the section adjacent to the driven section 52. In a common arrangement, the support arm has a socket 46 which receives a ball 48 which is attached to the support structure 36 which is in turn attached to the driven section 50. The ball and socket arrangement provides for relative movement between the driven section and the adjacent section. It also provides support for the end of the adjacent section. The end 51 of the driven section is connected to the end 53 of the adjacent section by the use of a flexible cylindrical sleeve 54 often made of rubber and secured by clamps 56 at each end to provide a continuous path for the water. The flexibility of the sleeve allows for relative movements of the sections about the ball and socket pivot.

In operation as a system the outermost section 55 is operated in a manner to pace the system. For example, the outermost unit may be set to run continuously at a preselected speed by conventional means. This determines the rotation rate of the system about the terminal 28. The first unit radially inward from the outermost section 55 will start running when a control associated with its drive determines that the two sections are out of alignment. The misalignment then occuring would indicate that the inner section is behind, or lagging, the desired position relative to the outer section in the direction of travel. The drive unit associated with the inner section is stopped when the associated control determines that the section is ahead, or leading the desired position relative to the outer unit. Each interior section is controlled in a similar manner such that each interior section is stopped or started in accordance with its position relative to the next section radially outward from the terminal 28. Thus the irrigation system 20 will pivot around the terminal with the sections 22 sweeping radially in a substantially aligned manner.

The operation of the interior motors may be such as to adjust their speed to maintain the alignment rather than just starting and stopping the drive.

The below described control system is not limited to being used with the particular above described irrigation apparatus. The particular configuration described above is meant to be illustrative of the general type of system with which such a control system may be used. Even further, the control system below described may be utilized with any apparatus where misalignment between two members varies to generate an output signal in response to generated signals indicative of the angular relationship.

Figure 3:
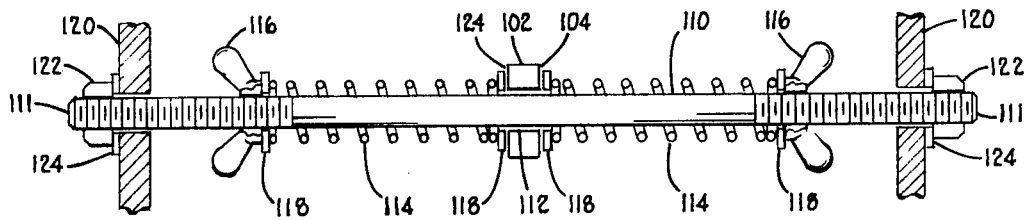
FIG. 3 is a detailed sectional view of the end of the rod and the associated mounting structure on the line 3–3 of FIG. 2 illustrating the adjustable position rod and clevis arrangement of the preferred embodiment.

A strain gauge 100 is used to detect the angular misalignment of the sections. The strain gauge may be attached to any surface which deflects variably when the sections 50 and 52 vary in alignment. If the sections are rigidly coupled together the surfaces of the sections or the coupling between the sections would provide such a deflecting surface. Preferably though, a separate beam member, such as a bar having a rectangular cross-section 102, is attached to the driven section 50 and the adjacent section 52 so that the surface 104 of the bar is caused to deflect as the two sections vary in alignment. This arrangement is preferably utilized with a flexible connection 54, rather than a rigid connection between the sections to localize the bending to the intersection of the two sections, so that the deflections may be more sensitively detected. The beam member may be attached in any manner to the separate sections, so long as misalignment variations in the horizontal plane cause the surface of the beam member to deflect. Preferably the connections are made such that the rotational movement of the sections, the longitudinal movement, and misalignment of the sections in the vertical plane containing the sections do not deflect the beam surface greatly relative to the deflections caused by misalignment in the horizontal plane. The preferred mounting arrangement is shown in FIG. 2. The bar 102 is aligned so that the deflecting surface 104 is in the vertical plane containing the driven section. The bar is attached to the adjacent section by a clevis 106 and pin 108 arrangement on the end of the support arm 44. The pin 108, passing through the bar, is aligned horizontally and transversely to the bar 102 to allow the bar to pivot in the vertical plane about the pin. The bar 102 is attached to the driven section also in what is fundamentally a clevis and pin attachment. It differs from the first described connection in that the pin is in the form of a rod 110 having threaded ends 111. The rod 110 passes through a longitudinal slot 112 in the bar. This will permit some rotational movement of the bar about the rod 110 in the vertical plane as well as longitudinal movement of the bar. To permit rotational movement of the bar, while limiting lateral movement, the bar is held between a pair of compression springs 114, as shown in FIG. 3. The springs are mounted on the rod 110 and compressed between a pair of adjustable wing nuts 116. Washers 118 are placed at either end of the springs 114 to facilitate mounting and uniform distribution of forces. With slot 112 width larger than the diameter of the rod 110 the bar 102 may undergo a certain amount of rotational movement without great resistance, but lateral movement toward either wing nut 116 is increasingly resisted by the springs 114. The lateral position of the bar 102 between the support structure members 120 forming the clevis which retains the rod is adjusted by rotating a pair of nuts 122 to move the rod laterally. Washers 124 are provided between the nuts 122 and the support structure members 120 to facilitate operation. Preferably the bar is on the same elevation as the ball 48 and socket 46 to minimize the effect of the rotational movement of the sections on the bar 102.

In operation when a variation in the alignment between the sections in the vertical plane between the sections 50 and 52 occurs the bar will rotate about the pin 108 and rod 110 with the rod moving within the slot 112. Since the bar moves freely in these directions the surface of the bar 104 will not be stressed and consequently will not be deformed. When there is rotational misalignment between the two sections 50 and 52 the springs 114 permit the bar 102 to rotate so that the surface of the bar 104 is not stressed significantly. When there is a misalignment of the sections in the horizontal plane, indicating that one section is leading or lagging the other, the bar is stressed by an amount and in a manner that corresponds to the degree and direction of misalignment. Such stressing of the bar 102 will appear as a deformation of the bar surface 104 and consequently be monitored by the strain gauge 100. A misalignment in one direction appears as a compression of the bar surface and a tensioning if in the other direction. The opposite bar surface 124 is oppositely deformed and may have a strain gauge mounted on it, preferably, opposite the first strain gauge.

Lateral adjustment of the bar 102 relative to the support structure members 120 can be achieved by using wing nuts 116 but use of the nuts 122 is preferred, because the spring tension is not affected. The strain gauges are connected to the control box 42 by connection wires 126.

BASIC FORM OF ELECTRICAL CONTROLS USING A SINGLE SENSING CIRCUIT

Figure 4:
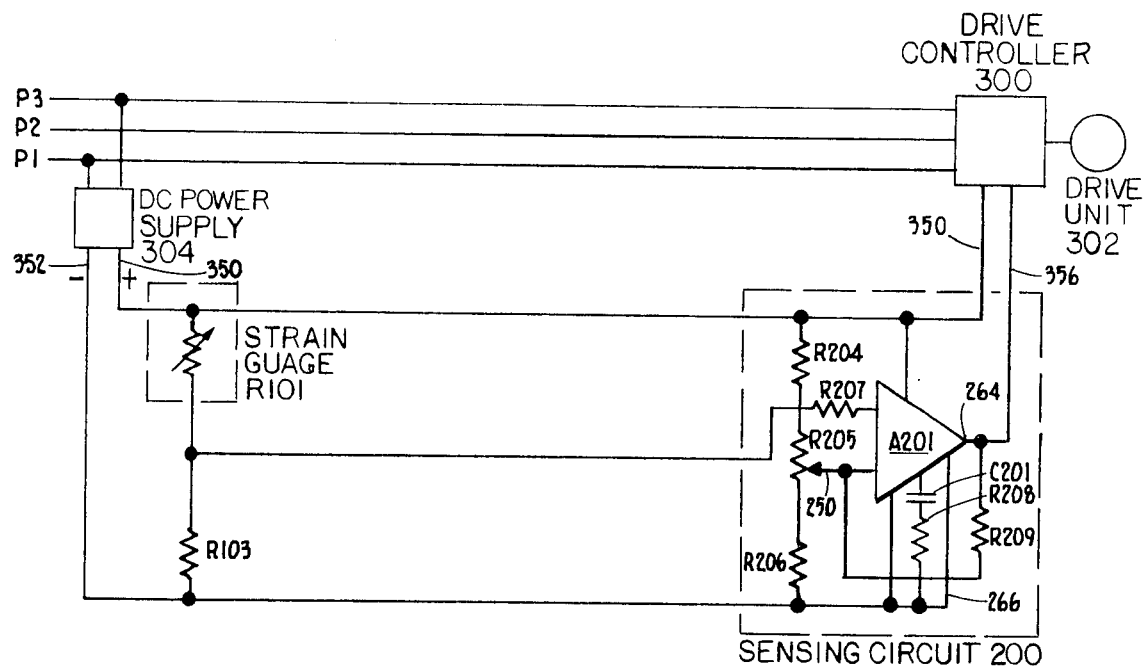
FIG. 4 is an electrical schematic of a basic form of the electrical controls using a single sensing circuit.

Referring to FIG. 4, the typical electrical control system for a single section is supplied system three phase AC power as indicated by conductors P1, P2, and P3. This power is similarly supplied to each section, typically by conductors running the length of the irrigation system 20 and connected to an external source connected to the irrigation system at the distribution terminal. Three phase power permits reversing the drive motors simply by reversing any two phases.

Alternatively, DC or single phase AC power may be used with the corresponding circuit to those shown and described below suitably modified in conventional ways to operate compatibly.

The system power is supplied to a drive controller 300 which directs the operation of the drive unit 302 which in turn operates the drive wheels 38 associated with the controlled section. The drive unit may consist of simply a motor or may consist of a motor and any of many types of couplings to control the output of the motor reaching the wheels. It may include a constant speed or variable speed drive output. The drive controller 300 is a control system for operating the drive unit in response to control signals supplied to it. In its most basic form the controller would be a motor starter relay which supplies or interrupts the power to a drive motor 40 depending on the presence or absence of a control signal or its magnitude. Another configuration of the drive controller may consist of a system to variably alter the speed of the drive unit 302 in response to the magnitude of an input signal. From this point on the disclosure will be directed to a drive controller 300 that is simply a motor starter and a drive unit 302 that is a constant speed motor mechanically coupled to the drive wheels and responsive to the presence or absence of a voltage signal. Other controller and drive units will operate in a similar manner.

A DC power supply 304 deriving power from P1 and P3 provides a source of power through a positive connection 350 and a negative connection 352 to that portion of the control system which supplies the input signal to the drive controller 300 on connections 350 and 336.

The strain gauge, shown electrically as R101, and a fixed resistor R103 of comparable resistive magnitude are connected in series between the positive and negative DC connections 350 and 352, respectively, and to a sensing circuit 200 in the manner illustrated in FIG. 4. Resistors R204, R205, and R206 along with resistor R103 and the strain gauge R101 form a wheatstone bridge configuration, to permit monitoring variations in the strain gauge resistance due to deflections of the surface on which the strain gauge is mounted. The operational transconductance amplifier A201 senses the variations and provides a corresponding output signal on conductor 356. Amplifier input resistor R207, feedback resistor R209, and the noise suppression elements: resistor R208 and capacitor C201 are selected to suit the particular parameters of the operational transconductance amplifier A201 used.

In operation, a change in the resistance of the strain gauge R101 is monitored and when a value corresponding to the driven section lagging the adjacent section excessively a signal is generated by the amplifier A201 to cause the drive controller 300 to start the drive unit 302. When an opposite change in the resistance of the strain gauge occurs indicating that the driven unit is advancing and finally reaches a level corresponding to the driven section leading the adjacent section excessively the amplifier A201 changes its output signal to stop the drive. More specifically an increase in the strain gauge resistance R101 will cause the operational transconductance amplifier A201 to generate a signal detected by the drive controller through connections 350 and 356 when it reaches a value dependent on circuit parameters. When the resistance decreases to a point similarly dependent on circuit parameters the signal is caused to disappear. The drive controller 300 is responsive to the presence or absence of a signal. Whether it starts or stops on presence of a signal, is coordinated with the direction of travel since whether an angle represents a leading or lagging relationship is dependent on the direction of travel. Because of the hysteresis of the amplifier A201 the drive will stay on once started until the opposite limit of alignment variation is reached and then turn off and remain off until the first limit is reached again to restart the drive. The hysteresis can be varied somewhat by changing the value of the feedback resistor R209. For example, the hysteresis may allow a 2° angular variation between the driven section and the adjacent section. Thus the drive having such a control range of 2° may start the drive when the drive section is lagging by 1° and stop when it is leading by 1°, the control range centered on 0°. By adjusting the tap 250 connecting the amplifier A201 to a midpoint of resistor R205 or, alternatively adjusting the rod 110 laterally, the center of the control range may be altered. For example, the drive might start at lagging 2° and stop at 0°.

The circuit for detecting variations in the strain gauge resistance and producing the necessary signals for the drive controller 300 is not limited to that shown in FIG. 4. Similarly performing circuits may be utilized which are based upon, for example, operational amplifiers, Schmitt trigger circuits, comparators, transistor circuitry, or integrated circuitry rather than the operational transconductance amplifier.

To be compatible with a variable speed drive the output of the strain gauge monitoring circuit would be adapted to produce a variable output signal in response to variations of the strain gauge. Thus the signal input to the drive controller 300 would, rather than being a two state output for on and off conditions, produce a continuously variable signal causing a drive output speed to range from stop to full speed depending on the alignment of the sections. For example, changing the transconductance amplifier A201 from a comparator configuration, as shown in FIG. 4, to a linear operational amplifier would result in such a detection circuit.

ANOTHER EMBODIMENT OF THE ELECTRICAL CONTROL USING TWO SENDING CIRCUITS

Figure 5:
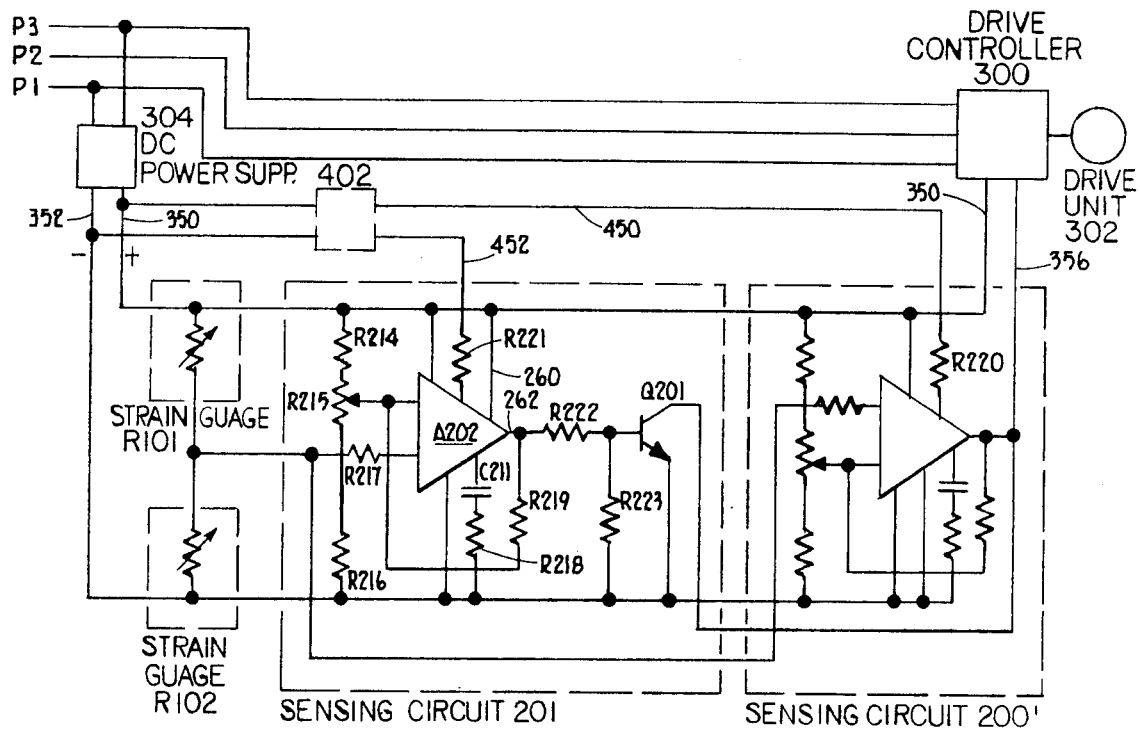
FIG. 5 is an electrical schematic of another embodiment of the electrical control using two sensing circuits.

Another embodiment of the control system is that shown in FIG. 5. The circuit consists of an additional comparator circuit 201 and a selection circuit to select which comparator circuit will be operative. Each sensing circuit 200 and 201 corresponds to a direction of travel of the drive unit, forward or reverse, and operates only when the system operation is in that direction.

A second strain gauge shown electrically as R102 is used in place of fixed resistor R103 in FIG. 4. This strain gauge would be mounted on the side of the bar 102 opposite the first strain gauge. Thus when one gauge is sensing deflections caused by compression the other is sensing deflections caused by tension. This permits a doubly sensitive indication of the alignment of the sections 22 and an insensitivity to temperature variations. The circuit shown in FIG. 4 may utilize two strain gauges, similarly.

The sensor 200' is identical to that shown in FIG. 4 with the addition of a programming connection 450 to a direction signal generator 402 through program input resistor R220.

The sensor circuit 201 is similar to that of sensor circuit 200 of FIG. 4. Resistors R214, R215, and R216 perform the same functions as R204, R205, and R206 respectively. Resistors R219 and R217 perform the same functions as R209 and R207 respectively and capacitor C211 and resistor R218 perform the same as C201 and R208 respectively. The operational transconductance amplifier A202 performs the same as A201 but the input connections to the bridge are reversed. Like sensor circuit 200' the amplifier A202 is connected by programming connection 452 through program input resistor R221 to the direction signal generator 402. The connections of A202 also differ from the connections of A201 in that connection 260 to the positive DC connection 350 corresponds to the output connection 264 of A201 and output connection 262 of A202 corresponds to connection 266 to the negative DC connection 352. Output connection 262 of amplifier A202 is connected to the drive controller connection 356 through a transistor Q201 having its base connected to a midpoint between two voltage dividing resistors R222 and R223 which are connected in series between the output of amplifier A202 and negative DC connection 352.

The direction signal generator 402, described below in several embodiments is connected to the DC positive and negative connections 350 and 352. The direction signal generator sensor connections 450 and 452 to the amplifiers are caused to be alternately connected to the positive and negative DC supply depending on the direction of system travel. Whether the connection to the amplifiers is positive or negative determines whether the amplifier generates an output signal. Thus only one amplifier operates when the system is operating.

When the system is in operation the sensing circuits operate as previously described to generate stop and start signals applied to the drive controller 300 which in turn stops and starts the drive unit according to whether the driven section is lagging or leadng its desired position reltive to the adjacent section. Reversing the connections of A202 to the bridge circuit from the A201 connections, the change in the amplifier connections 260 and 262 from the A201 connections, and the transister Q201 each cause a sensor output phase reversal of 180°. Since there are three such reversals, an odd number, the output of sensor circuit 201 is 180° out of phase with that of sensor circuit 200' so that the start and stop signals are coordinated with the direction of travel.

A FORM OF THE DIRECTION SIGNAL GENERATOR USING A SWITCH

Figure 6:
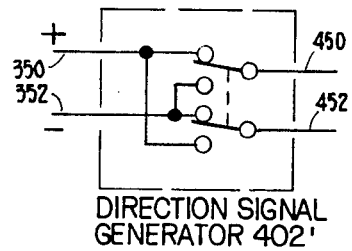
FIG. 6 is an electrical schematic of the direction signal generator using a switch.

FIG. 6 illustrates an embodiment of the direction signal generator 402'. The circuit is simply a double throw switch. The switch position is reversed when the direction of operation is reversed.

ANOTHER EMBODIMENT OF THE DIRECTION SIGNAL GENERATOR USING PHOTODIODES AND PHOTOTRANSISTORS

Figure 7:
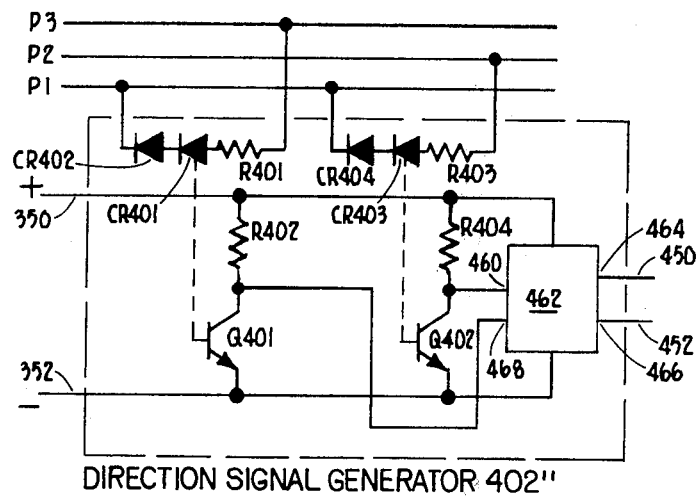
FIG. 7 is an electrical schematic of a direction signal generator using photodiodes and phototransistors to detect phase sequence.

Direction signal generator 402", illustrated in FIG. 7. produces the direction signals on connections 450 and 452 in response to the phase relationship of the three phase AC power on P1, P2, and P3 supplied to the drive controller 300. Photodiode CR401 is connected in series with resistor R401 and protective diode CR402 between AC power phases P1 and P3. Resistor R401 is a current limiting resistor. Phototransistor Q401 responds to the photodiode CR401 and isolates the high volage from the low voltage. Transistor Q401 is connected in series with resistor R402 between the DC positive and negative conections 350 and 352 so that the transistor output voltage sensed at the collector of the transistor is at or near the positive voltage when Q401 is nonconductive and at or near the negative voltage when Q401 is conductive creating a series of pulses. In a similar manner resistor R403, photodiode CR403, and protective diode CR404 are connected in series between any other pair of phases, such as P1 and P2. The photodiode CR403 actuates phototransistor Q402 which is connected in series with resistor R404 between the positive and negative conductors. The collector of phototransistor Q402 alternately has a voltage at or near that of the positive or negative DC voltages as the AC voltage causes the photodiode CR403 to conduct or not conduct and in turn cause the phototransistor to turn on and off generating a second series of pulses. The collector of the phototransistor Q402 is connected to the clock input 460 of a "D" flip-flop, whose output 464 is connected to connection 450 and not-output 466 is connected to connection 452. The data input 468 of the flip-flop 462 is connected to the collector of the transistor Q401. In operation the high or low, that is positive or negative, voltage appearing at the data terminal 468 when the voltage turns high at the clock terminal 460 will appear and remain at the output 464. The voltage at the not-ouput 466 is opposite that of the output 464. If the AC phase sequence is one way there will be a high voltage at the data terminal whenever the clock terminal voltage goes high. If the phase sequence is reversed, as when changed to reverse the direction of travel of the irrigation system, the data terminal voltage is low each time. Thus the flip-flop 462 outputs indicate the phase sequence of the AC power and also may be used to indicate the direction of travel of the irrigation system. This phase sequence detector is not limited to use with the irrigation control system and may be used apart from it.

A MODIFIED FORM OF THE DIRECTION SIGNAL GENERATOR USING PHOTODIODES AND PHOTOTRANSISTORS ADAPTED TO RESPOND TO A VOLTAGE SIGNAL, INDICATIVE OF THE DIRECTION OF TRAVEL

Figure 8:
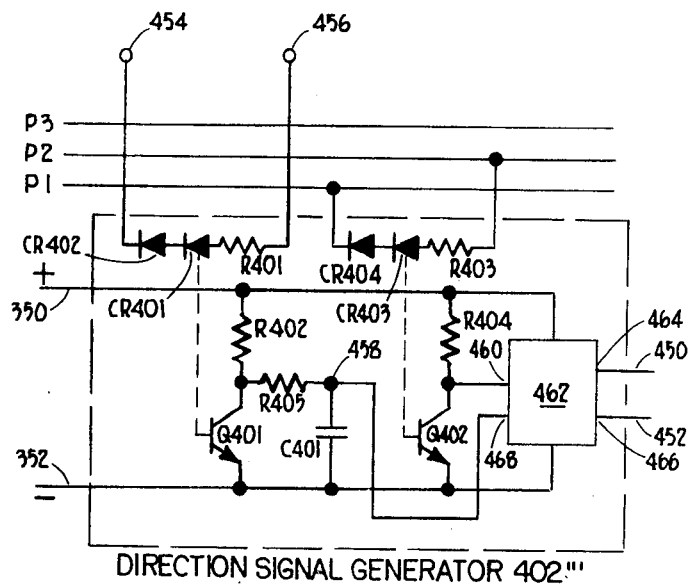
FIG. 8 is an electrical schematic of another embodiment of the direction signal generator using photodiodes and phototransistors with an RC network responsive to an external voltage signal indicative of the direction of travel.

Another embodiment of the direction signal generator 402''' is shown in FIG. 8. On some irrigation systems a voltage signal is provided which by its presence or absence is indicative of the direction of travel. The emobodiment of the signal generator 402''' is adapted to interface with such systems. The voltage signal, for example an AC signal, is applied at terminals 454 and 456 to resistor R401, CR401, and diode CR402. The photodiode CR401 actuates phototransistor Q401 such that when current flows through photodiode CR401, phototransisor Q401 turns on and the collector of phototransistor Q401 is low. Conversely, when the input AC signal is of reverse polarity, diode CR402 is blocking and no current flows in photodiode CR401, hence phototransistor Q401 is off and collector of phototransistor Q401 is high or positive. Resistor R405 and capacitor C401 form a RC network attached to the collector of phototransistor Q401 and the negative connection 352. The RC network acts as a filter to smooth out signal variations at the collector of phototransistor Q401 such that when an AC source is applied between terminals 454 and 456, the filtered output at the junction 458 of C401 and R405 is a relatively low value, i.e., nearly equal to the negative connection 352. This low voltage is applied to flip-flop 462 data input 468. The flip-flop operates as described in FIG. 7 in that a low voltage at the "D" input 468 when the clock input 460 changes from low to high will be stored in the flip-flop 462 as a low and output 464 will be low and not-output 466 will be high. Conversely, when no voltage is applied to terminals 454 and 456, then the collector of phototransistor Q401 will be high and the junction 458 between resistor R405 and capacitor C401 will be high. Thus the D input to flip-flop 462 will be high and when the clock input goes from low to high a high will be stored in flip-flop 462 and output terminal 464 will be high and not-output terminal 466 will be low.

The circuit operates similarly when the input signal applied to terminals 454 and 456 is a DC signal indicative of the direction of travel by its presence or absence.

A MODIFIED FORM OF THE DIRECTION SIGNAL GENERATOR WITH PHOTODIODES AND PHOTOTRANSISTORS USING IN ADDITION SWITCHING TRANSISTORS

Figure 11:
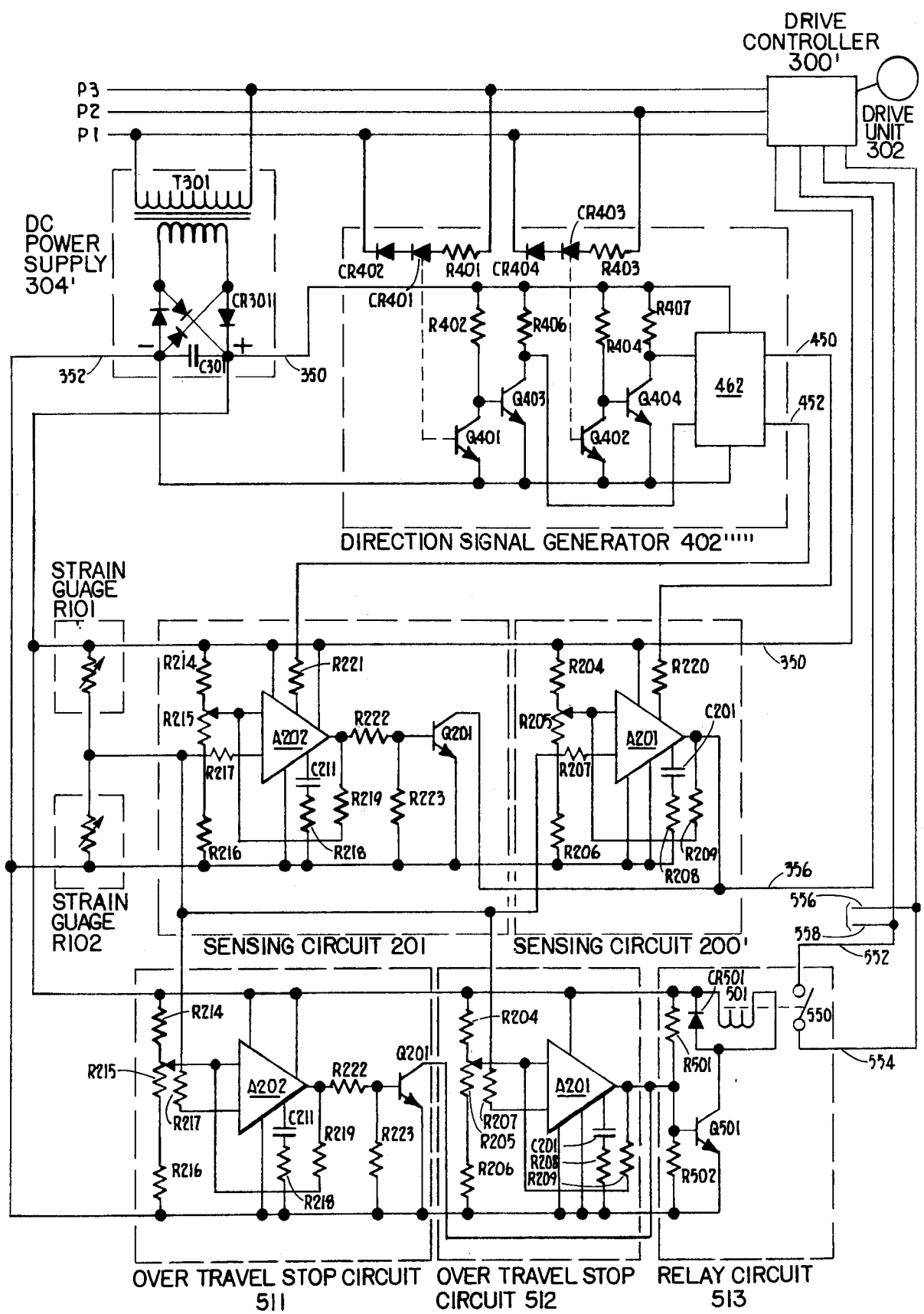
FIG. 11 is an electrical schematic of the preferred embodiment of the electrical controls using a modification of the direction signal generator illustrated in FIG. 7 using in addition switching transistors.

Another embodiment of the direction signal generator 402''''' is shown in conjunction with a complete system in FIG. 11. The operation is similar to 402'' described above except that the collector of phototransistors Q401 and Q402 are tied to the base of switching transistors Q403 and Q404 respectively. The collectors of transistors Q403 and Q404 provide the inputs for the flip-flop which results in a more rapid high to low and low to high signal transition than the configuration shown in FIG. 7. This phase sequence detector, likewise, may be utilized independently from the irrigation control system.

FURTHER EMBODIMENTS OF THE DIRECTION SIGNAL GENERATOR WITH PHOTODIODES AND PHOTOTRANSISTORS

The direction signal generator 402 using the photodiode and phototransistors may assume other configurations from those shown in the drawings. The circuitry connected to flip-flop data input shown in any of the embodiments may be utilized in combination with any of the flip-flop clock input circuits shown. All the above described circuitry as well as the below described direction signal generator circuitry may be utilized in a context other than an irrigation control system wherein phase sequence data or two state voltage signals are processed.

ANOTHER EMBODIMENT OF THE DIRECTION SIGNAL GENERATOR RESPONSIVE TO AN EXTERNAL VOLTAGE SIGNAL INDICATIVE OF THE DIRECTION OF TRAVEL

Figure 9:
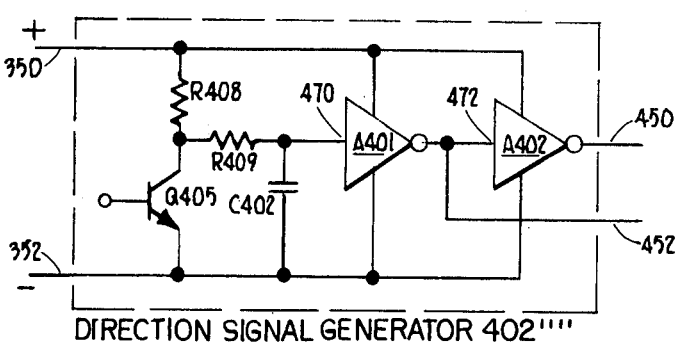
FIG. 9 is an electrical schematic of an another embodiment of the direction signal generator responsive to an external voltage signal indicative of the direction of travel.

Another embodiment of the direction signal generator 402'''' is shown in FIG. 9. In some irrigation systems a voltage signal is provided that by its presence or absence is indicative of the direction of travel. The embodiment of the signal generator 402'''' is adapted to receive a DC signal. In such systems where an AC signal is supplied it may be converted to a suitable DC signal by any suitable method, such as the use of photodiodes and phototransistors and RC networks as shown in FIG. 8. The voltage signal is applied to the base of transistor Q405. The collector of the transistor is tied to the resistor R408 which results in a high or low voltage at the collector depending on whether or not the transistor is conductive in response to the applied DC voltage on the base. Resistor R409 and capacitor C402 form an RC network performing as that formed by resistor R405 and capacitor C401, shown in FIG. 8. The use of the RC network avoids sudden switching caused by momentary disturbances in the signal applied to transistor Q405 and acts as a filter when AC signals are supplied. Amplifier A401 has its input 470 connected to the point between resistor R409 and capacitor C402. Its output is connected to connection 452 and an inverting amplifier A402 whose output is connected to connection 450. In operation the circuit parameters are selected such that the presence of a voltage signal applied to transistor Q405 will result in high voltage on connection 452 and a low voltage on connection 450. Absence of the voltage signal applied to transistor Q405 will reverse the signals on connections 450 and 452.

A MODIFIED FORM OF ELECTRICAL CONTROLS USING A SINGLE SENSING CIRCUIT WITH OVER TRAVEL STOP CIRCUITS

Figure 10:
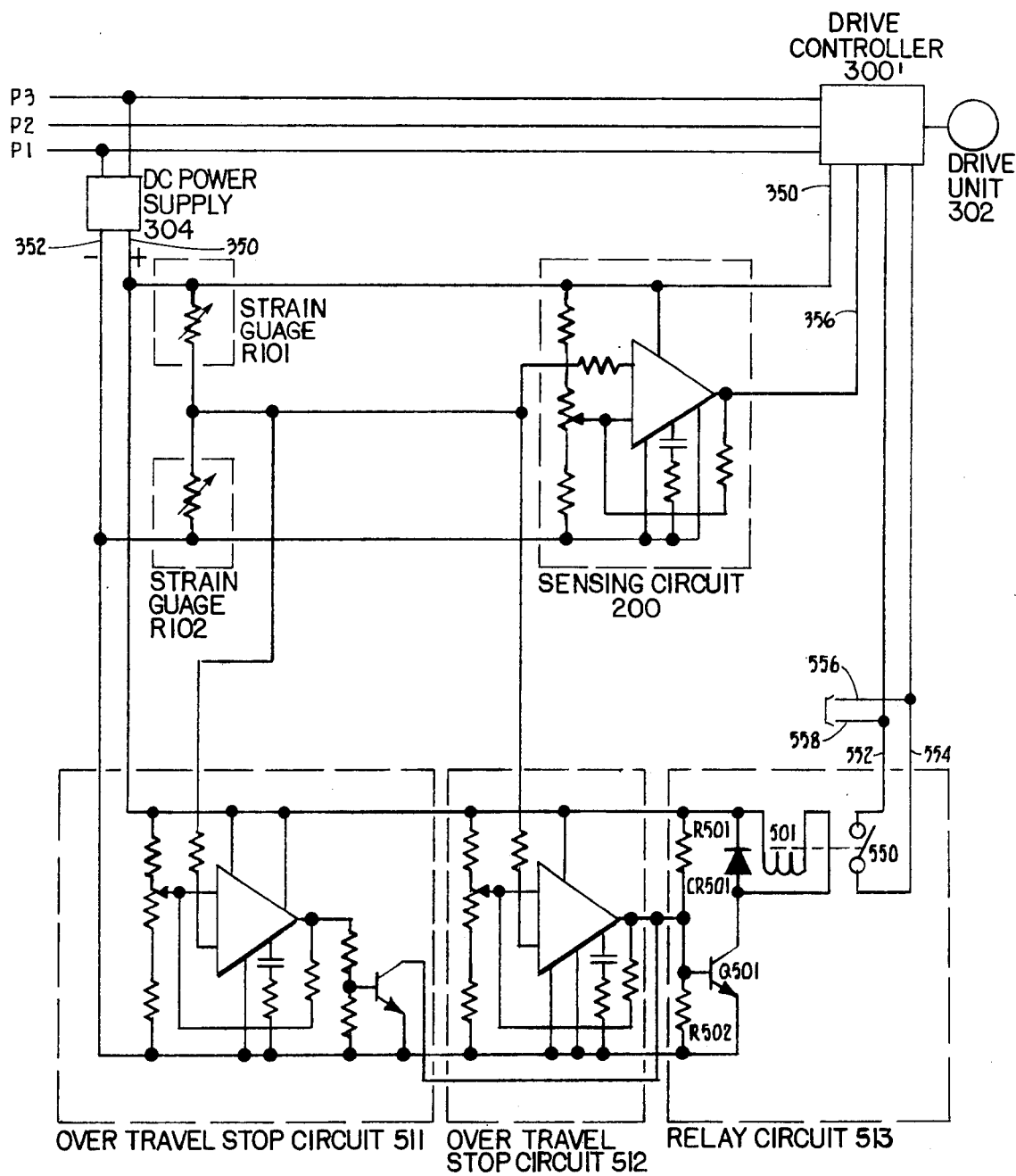
FIG. 10 is an electrical schematic of another embodiment of the electrical controls using a single sensing circuit with overtravel-stop circuits.

The embodiment of electrical control as shown in FIG. 10 is basically the circuit shown in FIG. 4 with an overtravel stop circuit added. Overtravel stop circuit 511 is in the same configuration and operates the same as the sensing circuit 201 shown in FIG. 5 and sensing circuit 512 is likewise the same as sensing circuit 200' also shown in FIG. 5. The difference between the overtravel stop circuits and the sensing circuits is that the overtravel sensing circuits parameters are selected so that when the driven section and the adjacent section misalignment exceeds that of the normal operating range a control circuit, such as the relay circuit 513, is actuated to stop the system. This prevents damage to the system that might otherwise occur. The relay circuit 513 is shown in a conventional configuration with resistors R501 and R502, transistor Q501, diode CR501, and the relay 501. In the configuration shown a relay contact 550 closes an otherwise open contact connected to the associated section drive controller 300' through connections 552 and 554 and the drive controllers for other sections through connections 556 and 558. The drive controllers may be adapted in a conventional manner to stop in response to an overtravel stop signal, such as the closing of the relay contact. In a similar manner the overtravel signal could actuate a breaker supplying power to the entire system and thus stop the operation.

THE PREFERRED EMBODIMENT OF THE ELECTRICAL CONTROL SYSTEM

The preferred embodiment of the electrical control system is shown in FIG. 11 and is preferably utilized in conjunction with the mechanical connection of the deflection bar 102 configuration shown in FIGS. 2 and 3 with a pair of strain gauges, one on either side of the bar. The components of the system operate and cooperate as described above. A form of DC power supply 304' is shown utilizing a conventional transformer T301, fullwave diode bridge CR301, and filtering capacitor C301 in a conventional manner.

A PARTICULAR EXAMPLE OF THE PREFERRED EMBODIMENT WITH DESIGNATED PARAMETER VALUES OBTAINED FROM ACTUAL USE

The preferred embodiment of the invention illustrated in FIGS. 2, 3, and 11 has been operated having the below designated parameter values: Electrical controls:

| sensing circuit 200': | sensing circuit 201: |
|---|---|
| R204 - 10k ohms | R214 - 10k ohms |
| R205 - 1k | R215 - 1k |
| R206 - 10k | R216 - 10k. |
| R207 - 10k | R217 - 10k, |
| R208 - 100 | R218 - 10k |
| R209 - 10M | R219 - 10M |
| R220 - 100k | R221 - 100k |
| C201 - .22 micro farads | R222 - 1k |
| A201 - CA 3094 R.C.A. | R223 - 10k |
| | C211 - .001 micro farads |
| | A202 - CA 3094 |
| | Q201 - 2N2222A |

-continued

```
Strain Gauges:
    R101 - 350 ohms Micro-Measurement
    R102 - 350 ohms Micro-Measurement
Overtravel Stop Circuit 512:      Overtravel Stop Circuit 511:
    R204 - 10k ohms                   R214 - 10k ohms
    R205 - 1k                         R215 - 1k
    R206 - 10k                        R216 - 10k
    R207 - 100k                       R217 - 100k
    R208 - 10k                        R218 - 10k
    R209 - 3.3M                       R219 - 4.7M
    C201 - .1 micro farads            R222 - 1k
    A201 - CA 3094 R.C.A.             R223 - 10k
                                      C211 - .001 micro farads
                                      A202 - CA 3094
                                      Q201 - 2N2222A Relay Circuit 513:
    R501 - 1k ohm
    R502 - 10k ohm
    Q501 - 2N2222A
    501 - No.Am. Phillips No. 46M01A00-12
    CR501 - 1N4007

Direction Signal Generator 402'''':
    R401 - 47k ohm                    CR402 - 1N4007
    R402 - 1M                         CR404 - 1N4007
    R403 - 47k                        462 - Type D flip-flop
    R404 - 1M                               CD 4013AE R.C.A.
    R406 - 10k
    R407 - 10k
    Q401/CR401 - 4N25
    Q402/CR403 - 4N25
    Q403 - 2N2222A
    Q404 - 2N2222A DC Power Supply:
    10V DC output/480 V.A.C. input
    C301 - 500 micro farads
    CR301   W005M Diode Bridge
Drive Controller - OPTO 22 No. 480DIO Solid State Relay Drive Unit:
3 H.P. 3, phase 480 V.A.C.
Direct Coupled Section Travel Speed: Aprox. 0.15 M.P.H.

Section length: 160 feet
Deflection Beam Member:
    1" x ¼" x 9" 6061 - T6 aluminum
```

Using the above parameters the system started the driven section when the adjacent section led by more than one degree. The driven section was stopped when the adjacent section lagged by more than one degree and the overtravel stop circuit stopped the system when the angular misalignment exceeded 5 degrees in either direction.

We claim:

1. An alignment system for monitoring the angular relationship between two articulating members and producing a signal indicative of the angular relationship comprising:
   a. a deflection surface attached to each of the adjacent members so that the surface is variable stressed and deflected as the alignment of the members vary;
   b. a strain gauge attached to the deflection surface and responsive to the varying stresses; and
   c. means for electrically sensing the defelctions sensed by the strain gauge and producing a signal indicative of the level of stress
   so that the signal is indicative of the angular relationship of the members.

2. An alignment system for monitoring the angular relationship between two articulating members and producing a signal indicative of the angular relationship, as claimed in claim 1, comprising in addition:
   a. a beam member having a surface forming the deflection surface;
   b. first means for attaching the first end of the beam member to the first articulating member; and
   c. second means for attaching the second end of the beam member to the second articulating member so that the deflection surface on the beam member is stressed in accordance with the alignment relationship of the two articulating members.

3. An alignment system for monitoring the angular relationship between two articulating members and producing a signal indicative of the angular relationship, as claimed in claim 2, wherein the beam member comprises a bar having a hole through its first end and a slot communicating with its second end; the first attachment means comprises a first clevis and a first pin passing through the hole in the bar to allow the bar to pivot about the first pin; and the second attachment means comprises a second clevis and second pin passing through the slot with a pair of springs coaxially located on the second pin on either side of the bar within the second clevis to permit the bar to pivot, move longitudinally, and rotate partially about its longitudinal axis.

4. In a mobile irrigation apparatus of the type having an elongated fluid distribution means including a plurality of articulating sections, a drive means associated with a section for propelling the corresponding section in a direction transverse to its longitudinal axis, and an alignment control means associated with the drive means for maintaining a substantially, aligned relationship between the driven and an adjacent section including a drive control responsive to an input signal to direct the operation of the drive means, the improvement wherein the alignment control means comprises:
   a. a defelction surface attached to the driven section and the adjacent section so that the surface is variably stressed and deflected as the alignment in the horizontal plane of the sections vary;
   b. a strain gauge attached to the deflection surface and responsive to the varying stresses;
   c. means for electrically sensing the deflections sensed by the strain gauge and producing the input signal applied to the drive control indicative of the position of the driven section relative to the adjacent section so that the distribution means travels over an area to be irrigated with the individual sections remaining in a substantially aligned relationship.

5. The improvement in a mobile irrigation apparatus, as claimed in claim 4, comprising, in addition:
   a. a beam member having a surface forming the deflection surface;
   b. first means for attaching the first end of the beam member to the driven section; and
   c. second means for attaching the second end of the beam member to the adjacent section so that the deflection surface on the beam member is stressed in accordance with the alignment relationship of the driven section and the adjacent section.

6. The improvement in a mobile irrigation apparatus, as claimed in claim 5, wherein beam member comprises a rectangularly cross-sectional bar horizontally aligned with the fluid distribution means having a horizontal hole in its first end and a slot communicating with the second end; the first attachment means comprises a first clevis and first horizontal pin, the first pin passing through the hole in the bar to allow the bar to pivot about the first pin; and the second attachment means comprises a second clevis and second pin, the second pin passing through the slot to permit the bar to pivot and move longitudinally.

7. The improvement in a mobile irrigation apparatus, as claimed in claim 6, wherein the second attachment means comprises, in addition, a pair of springs coaxially located on the second pin on either side of the bar within the second clevis.

8. The improvement in a mobile irrigation apparatus, as claimed in claim 4, of the type having in addition a means for stopping the operation of the apparatus in response to a system stop signal, wherein the alignment control means comprises, in addition; a means for electrically sensing the deflections sensed by the strain gauge and in response producing a system overtravel stop signal to shut down the irrigation apparatus if a particular angular variation between the driven section and the adjacent section occurs.

9. The improvement in a mobile irrigation apparatus, as claimed in claim 8, wherein; there are two such system overtravel stop sensing means associated with the deflection member to provide an overtravel safety to shut down the apparatus if the angular variation between the driven and the adjacent section exceeds desired limits in either direction.

10. In a mobile irrigation apparatus, as claimed in claim 4, wherein there is a first input signal means associated with drive forward operation producing the input signal in response to a signal indicative of forward travel and a second input signal means associated with the drive reverse operation producing the input signal in response to a signal indicative of reverse travel; and further comprising a means for generating signals indicative of the direction of travel which are applied to the first and second input signal means so that the input signal applied to the drive control is selectively chosen in accordance with the direction of travel to coordinate the alignment control with the direction of travel.

11. In a mobile irrigation apparatus, as claimed in claim 10, wherein the direction signal means comprises a single pole double throw switch.

12. In a mobile irrigation apparatus, as claimed in claim 10, of the type in which three phase power is utilized in the drive means and reversal of any two such phases reverses the direction of travel of the apparatus, wherein the direction signal means comprises; a first photodiode connected between a pair of power phases; a first phototransistor responsive to the output of the first photodiode; a second photodiode connected between another pair of power phases; and a second phototransistor responsive to the output of the second photodiode; so that the changes in the phototransistors each provide a series of pulses isolated from the power phases and the pulses in the two series have a sequential relationship indicative of the direction of travel.

13. In a mobile irrigation apparatus, as claimed in claim 12, wherein the direction signal means further comprises a "D" flip-flop; a means for connecting the first phototransistor to the clock terminal of the flip-flop; and a means for connecting the second phototransistor to the data terminal of the flip-flop; so that the flip-flop output signal connections provide separate and opposite signals indicative of the direction of travel.

14. In a mobile irrigation apparatus, as claimed in claim 13, wherein; the flip-flop clock terminal connection means includes a switching transistor and the flip-flop data terminal connection means includes a switching transistor.

15. In a mobile irrigation apparatus, as claimed in claim 10, of the type in which a voltage signal is provided where the level of the voltage signal is indicative of the direction of travel, wherein the direction signal means comprises: an RC network, a transistor connected to the RC network and responsive to the voltage signal to discharge the capacitor when it is conductive and to permit charging of the capacitor when it is nonconductive, and an inverting amplifier responsive to the capacitor voltage so that the inverting amplifier output provides a signal indicative of the direction of travel.

16. In a mobile irrigation apparatus, as claimed in claim 15, wherein the direction signal means comprises in addition a second inverting amplifier responsive to the output of the first inverting amplifier so that the inverting amplifier outputs provide opposite signals indicative of the direction of travel.

17. In a mobile irrigation apparatus, as claimed in claim 10 of the type in which an AC voltage is present when the system is operating and where a voltage signal is provided where the presence or absence of the voltage signal is indicative of the direction of travel, wherein the direction signal means comprises an RC network; a first photodiode to which the voltage signal is applied; a first phototransistor connected to the RC network and responsive to the first photodiode to discharge the capacitor when it is conductive and to permit the charging of the capacitor when it is nonconductive so that when the voltage signal is applied to the photodiode the RC network output remains at a low value and when the voltage signal is absent, the RC network output remains at a high value, a second photodiode connected to the AC voltage, a second phototransistor responsive to the second photodiode, a flip-flop, means for connecting the output of the RC network to the data terminal of the flip-flop; and means for connecting the output of the second phototransistor to the clock terminal of the flip-flop; so that the flip-flop output signal terminals provide separate and opposite signals indicative of the direction of travel.

18. In a mobile irrigation apparatus, as claimed in claim 4, of the type in which the drive means is a constant speed drive and the drive control is responsive to a first input signal to stop the drive means and a second input signal to start the drive means, wherein the input signal means further comprises an operational transconductance amplifier producing the first input signal applied to the drive control indicative of the driven section leading the desired position relative to the adjacent section and the second signal applied to the drive control indicative of the driven section lagging the desired position relative to the adjacent section.

19. In a mobile irigation apparatus, as claimed in claim 4, wherein there are a first and a second deflection surface variably and oppositely stressed and deflected, wherein there is a first strain gauge attached to the first surface and there is a second strain gauge attached to the second surface, and wherein the sensing means includes resistors forming with the first and second strain gauges a wheatstone bridge circuit to provide a circuit which is insensitive to temperature changes and twice as sensitive to deflections as a single strain gauge.

20. In a mobile irrigation apparatus of the type having an elongated fluid distribution means including a plurality of articulating sections, a three phase drive means associated with a section for propelling the corresponding section in a direction transverse to its longitudinal axis, the direction of travel reversed by reversal of any two phases, means for stopping the operation of the apparatus in response to a system overtravel stop signal, and an alignment control means for maintaining a substantially aligned relationship between the driven section and an adjacent section including a drive control responsive to a first input signal to start the drive means, and a second input signal to stop the drive means, the improvement wherein the alignment control means comprises:

a. a beam member having two opposite surfaces attached to two adjacent sections so that the two opposite surfaces of the member are variably and oppositely stressed and deflected as the alignment in the horizontal plane of the sections vary;

b. a wheatstone bridge circuit having two adjacent legs formed by strain gauges attached to each of the two opposite member surfaces to respond to the section alignment variations;

c. two means for electrically sensing the deflections sensed by the strain gauges, each associated with a direction of travel and each producing, in response to a signal indicative of the associated direction of travel, the first input signal applied to the drive control indicative of the driven section leading the desired position relative to the adjacent section and the section and the second input signal applied to the drive control indicative of the driven section lagging the desired position relative to the adjacent section; said means including an operational transconductance amplifier responsive to the voltage variations across the wheatstone bridge caused by section alignment variations;

d. a direction signal generator having a first photodiode connected between a pair of phases, a first phototransistor responsive to the output of the first photodiode; a second photodiode connected between another pair of phases; a second phototransistor responsive to the output of the second photodiode; a D flip-flop having each output connected to a deflection sensing means; means for connecting the output of the first phototransistor to the clock terminal of the flip-flop, and means for connecting the output of the second phototransistor to the data terminal of the flip-flop, so that the output of the phototransistors each provide a series of pulses isolated from the power phases and the pulses in the two series bear a sequential order indicative of the direction of travel and the flip-flop senses the order and provides separate and opposite output signals to operate the appropriate deflection sensing means; and e. two means for electrically sensing the deflections sensed by the strain gauges connected to the wheatstone bridge and producing a system stop signal to provide an overtravel safety to shut down the apparatus if the angular variation between the sections exceeds the desired limits in either direction.

* * * * *